United States Patent [19]

Harries

[11] 3,912,339
[45] Oct. 14, 1975

[54] MODULATOR ASSEMBLIES FOR HYDRAULIC BRAKING SYSTEMS

[75] Inventor: David Anthony Harries, Monkspath, England

[73] Assignee: Girling Limited, Birmingham, England

[22] Filed: May 22, 1973

[21] Appl. No.: 362,797

[30] Foreign Application Priority Data
June 6, 1972 United Kingdom............... 26229/72
July 6, 1972 United Kingdom............... 31609/72

[52] U.S. Cl. ........................... 303/21 F; 188/181 A
[51] Int. Cl.² ........................................... B60T 8/06
[58] Field of Search ............... 303/21 F; 188/181 A

[56] References Cited
UNITED STATES PATENTS

| | | |
|---|---|---|
| 3,556,609 | 1/1971 | MacDuff............................ 303/21 F |
| 3,671,085 | 6/1972 | Pasek et al........................ 303/21 F |
| 3,694,038 | 9/1972 | Ingram et al...................... 303/21 F |
| 3,704,044 | 11/1972 | Ingram et al..................... 303/21 F |

*Primary Examiner*—Trygve M. Blix
*Assistant Examiner*—Barry L. Kelmachter
*Attorney, Agent, or Firm*—Imirie, Smiley & Linn

[57] ABSTRACT

A pressure modulator assembly for use in anti-skid braking systems includes a first piston movable in a bore communicating with a brake circuit, and a second piston acting on the first piston, the position of the second piston being controlled by fluid pressure. The first and second pistons are arranged side-by-side and two or more first pistons can be angularly spaced around one second piston.

12 Claims, 15 Drawing Figures

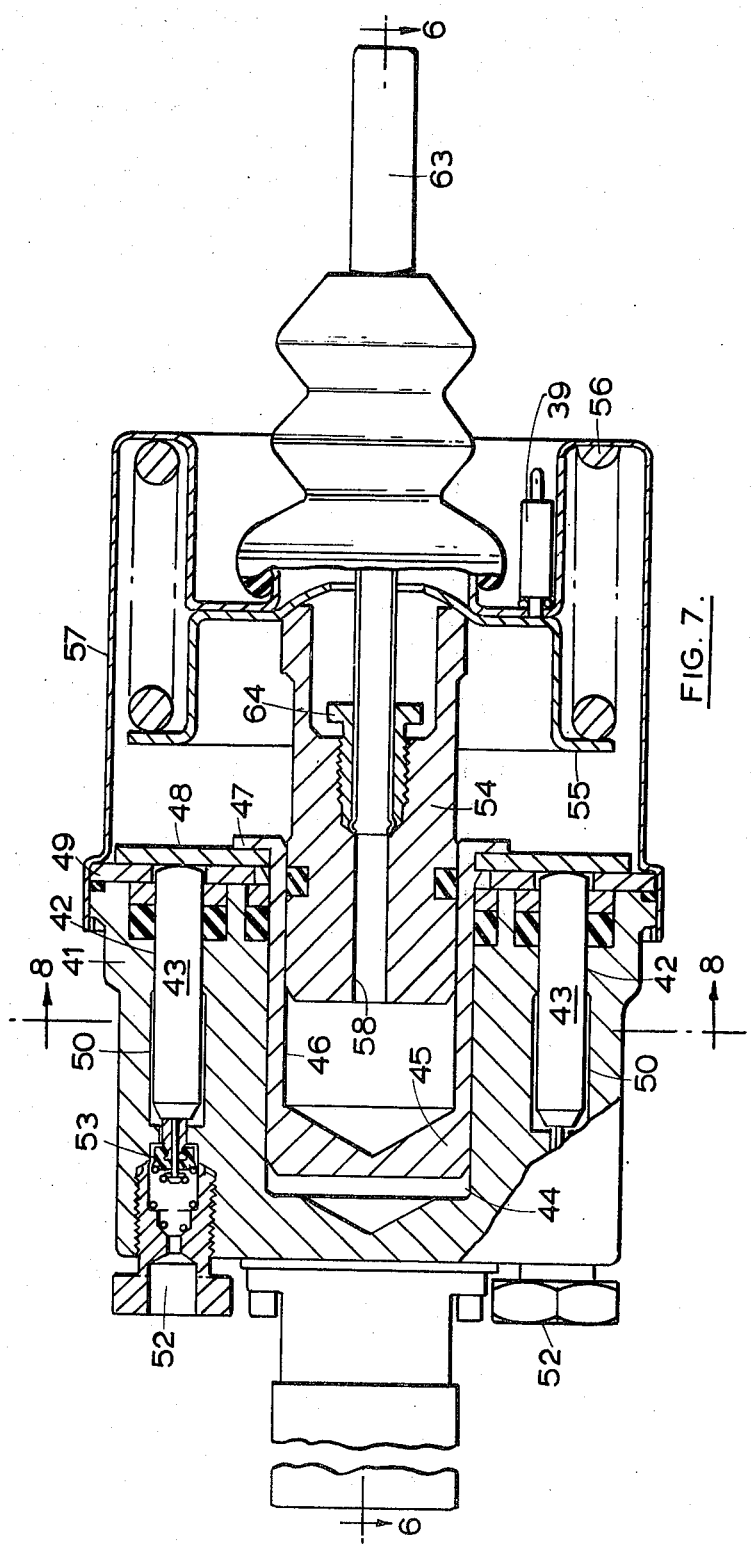

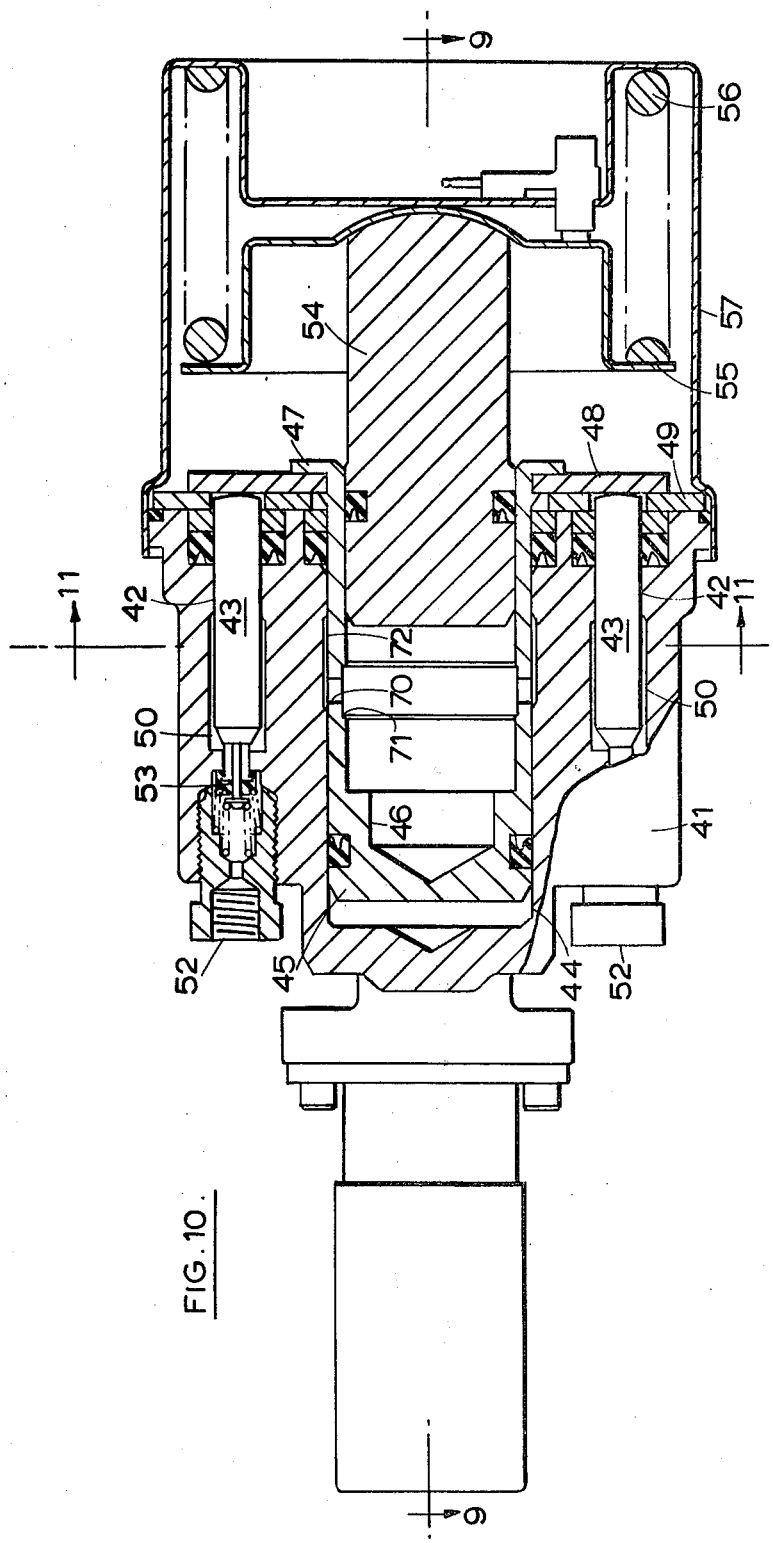

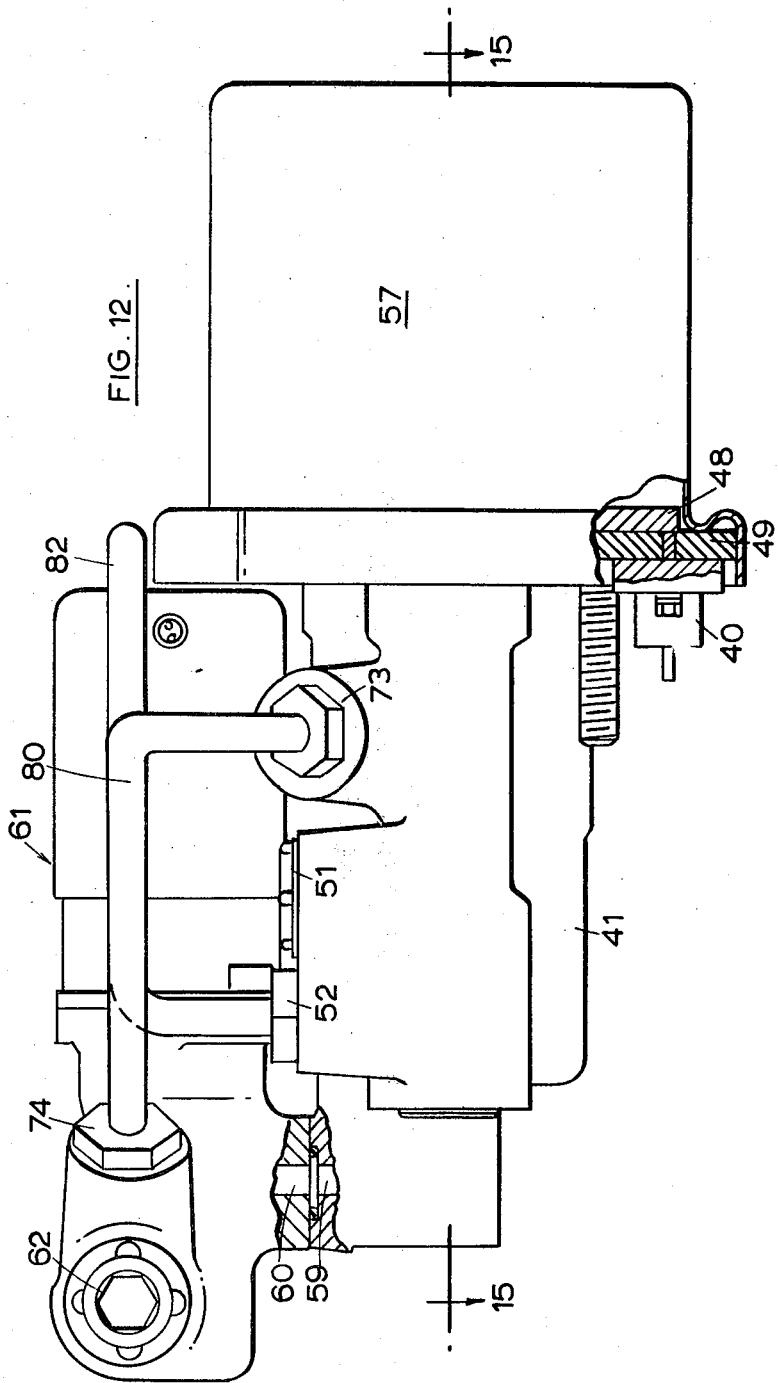

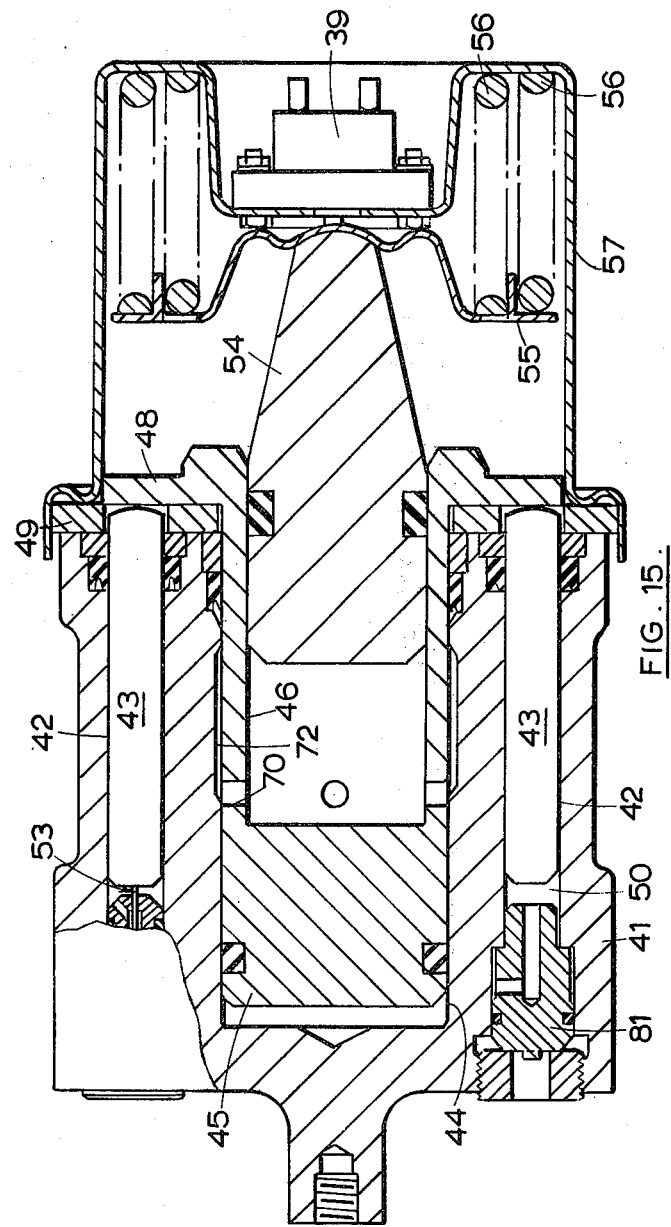

MODULATOR ASSEMBLIES FOR HYDRAULIC BRAKING SYSTEMS

This invention relates to improvements in modulator assemblies for use in hydraulic anti-skid braking systems for vehicles of the kind comprising at least one chamber having an inlet for connection to a fluid pressure source and an outlet for connection to the slave cylinder of a wheel brake, a first piston working in a first cylinder bore in communication with the chamber and; movable between a first advanced position in which the effective volume of the chamber is at a minimum value and a second retracted position, and a second piston working in a second cylinder bore, acting on the first piston and adapted to be subjected to hydraulic fluid under pressure over a first area in order to normally urge the first piston into the first advanced position, the second piston also being adapted to be subjected to hydraulic fluid under pressure over a second area opposed to the first area in order to allow the first piston to move into the second retracted position when the deceleration of the braked wheel exceeds a predetermined value.

According to our invention in a modulator assembly of the kind set forth the first and second pistons are arranged side-by-side with the second area of the second piston in advance of the point where the second piston acts on the first piston.

There may be a plurality of first pistons arranged with their axes parallel to and angularly spaced about the axis of the second piston.

When there are two first pistons, the second piston is preferably arranged between the first pistons so that the axes of the three pistons are parallel and co-planar. This provides a compact arrangement both in the radial direction and in the longitudinal direction. Compare especially an arrangement in which the second area is to the rear of the first piston, effectively extending the length of the piston assembly.

Each of the chambers associated with a first piston may be arranged for connection to a separate brake circuit or alternatively the outlet of one chamber may be connected to the inlet of the second chamber so that both chambers may be connected in a single brake circuit.

Preferably the cylinder bores for the first and second pistons are included in a cylinder block, the pistons extending beyond a plane face of the block, and a member extending radially from the second piston engages the or each first piston.

A modulator assembly of the kind set forth may include a solenoid control valve which is energized when the deceleration of the braked wheel exceeds the predetermined value to allow high pressure fluid to act on the second area of the second piston. According to another feature of our invention such a solenoid valve has a cylindrical bore in which are sealed two valve seat members, a valve seat in one member being axially spaced from a valve seat in the second member by an axially extending portion integral with one of the members.

Four embodiments of modulator assemblies according to this invention are illustrated in the accompanying drawings in which.

Figure 4:
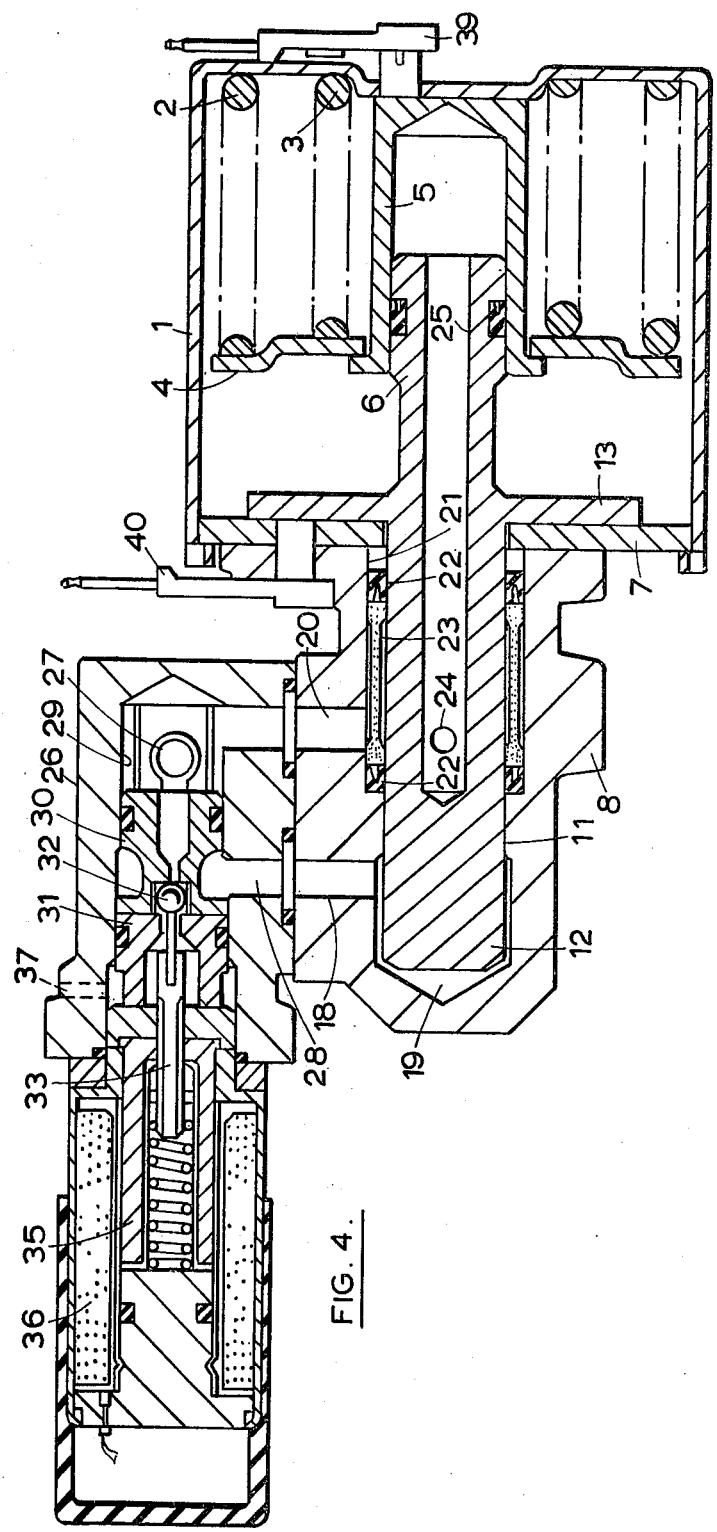
FIG. 4 is a section on the lines 4—4 of FIG. 2.
Figure 5:
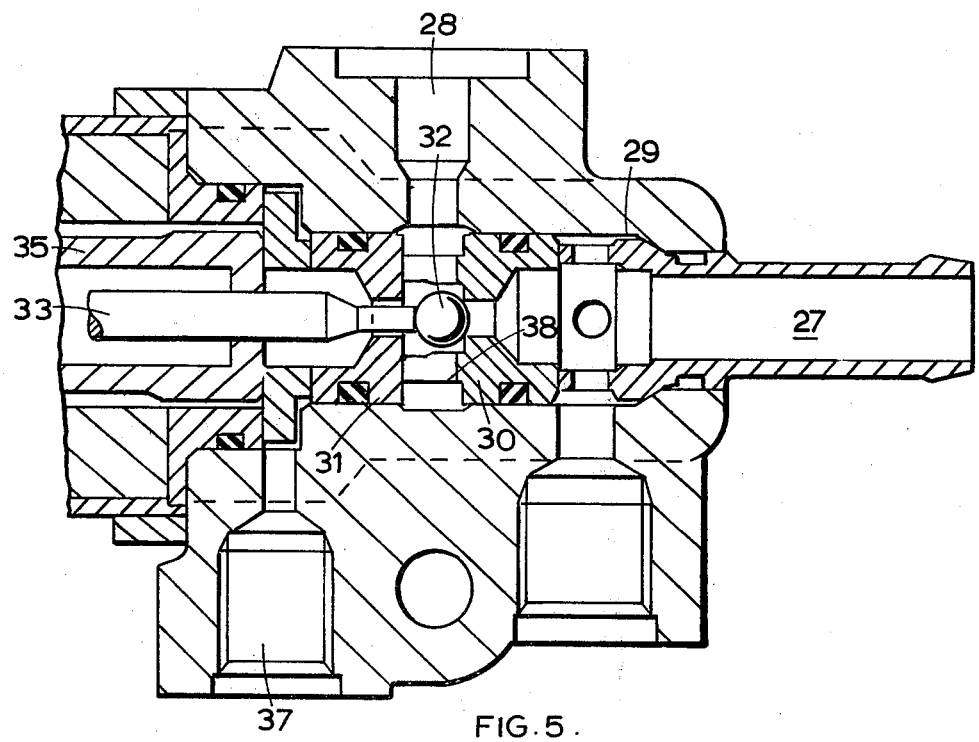
Figure 6:
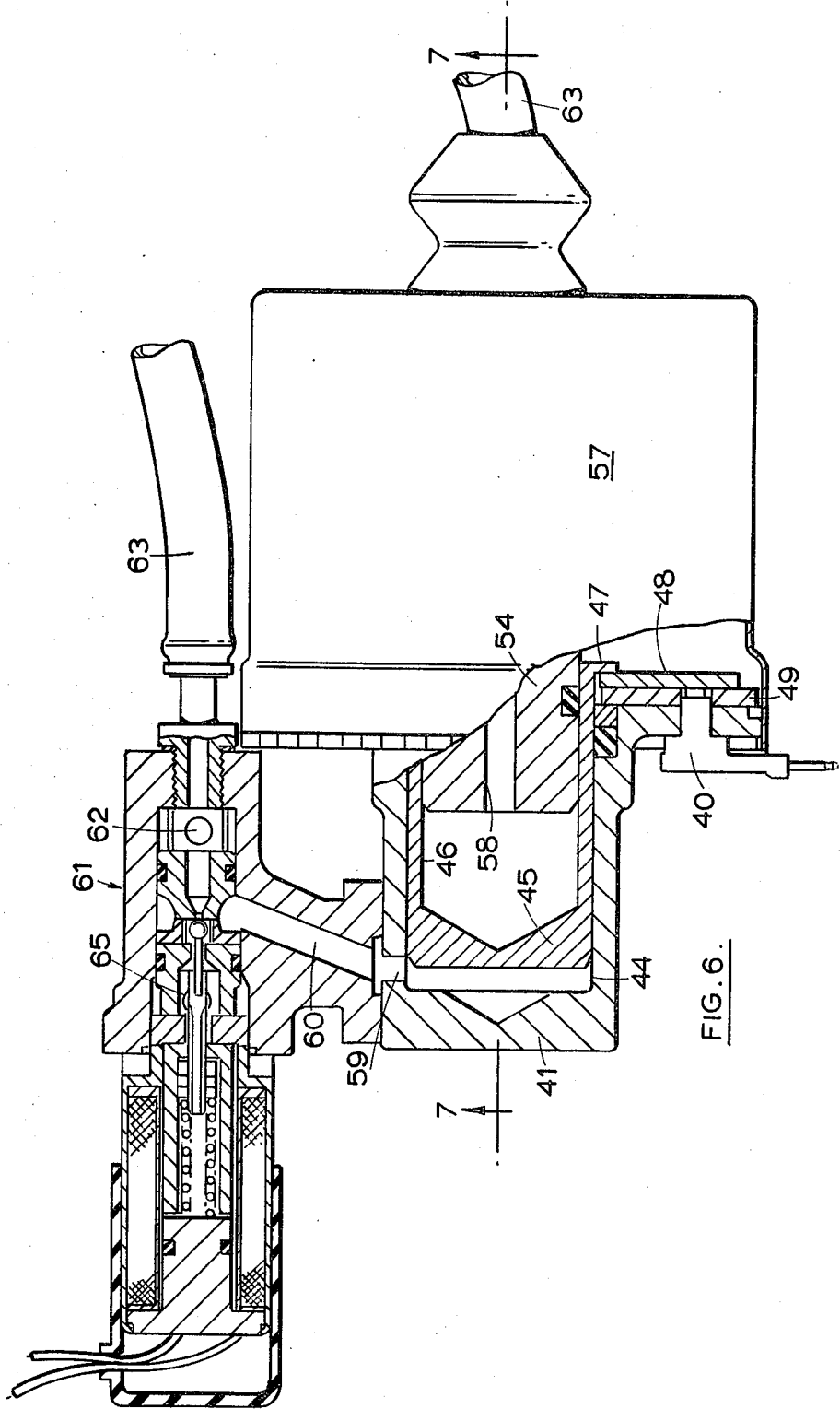
Figure 8:
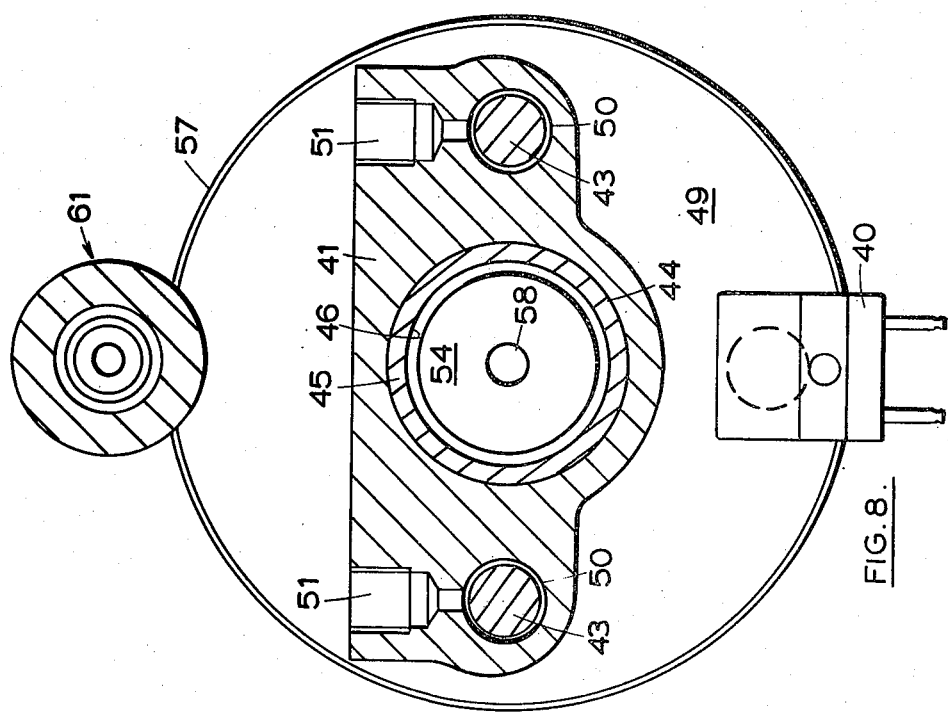
Figure 13:
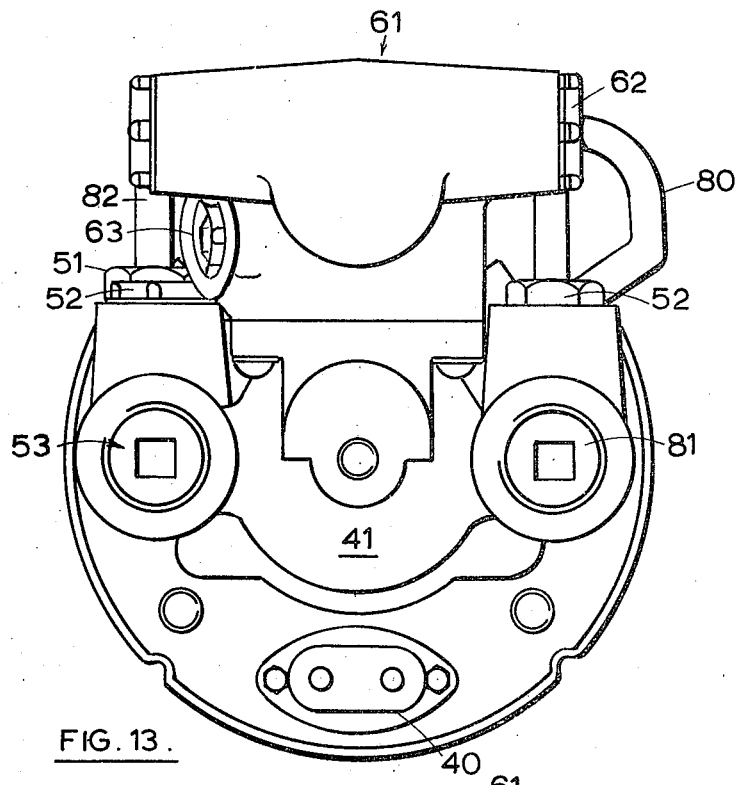
Figure 14:
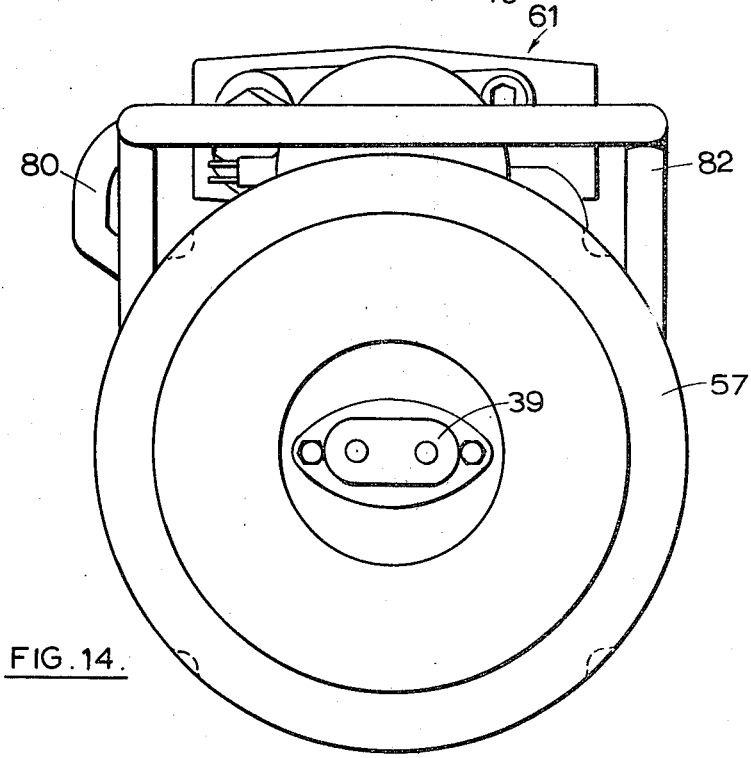

FIG. 5 is an enlarged section through a solenoid valve similar to the solenoid valve shown in FIG. 4, FIG. 6 is a side view of a second embodiment of a modulator assembly partly in section, FIG. 7 is a section on the lines 7—7 of FIG. 6, FIG. 8 is a section on the lines 8—8 of FIG. 7, FIGS. 9–11 are sections, corresponding to FIGS. 6–8, of a third embodiment, FIGS. 12–14 are side and end views of a fourth embodiment of a modulator assembly, and FIG. 15 is a section on the lines 15—15 of FIG. 12.

Figure 1:
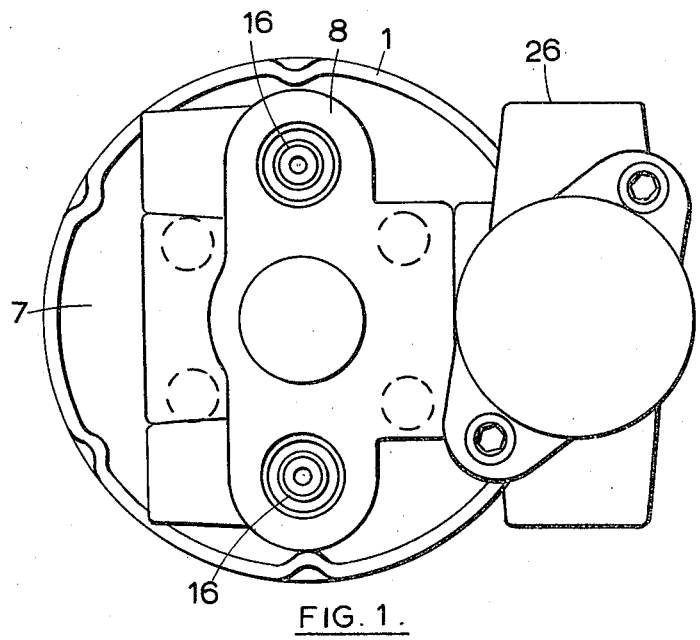
FIG. 1 is an end view of a first embodiment.
Figure 3:
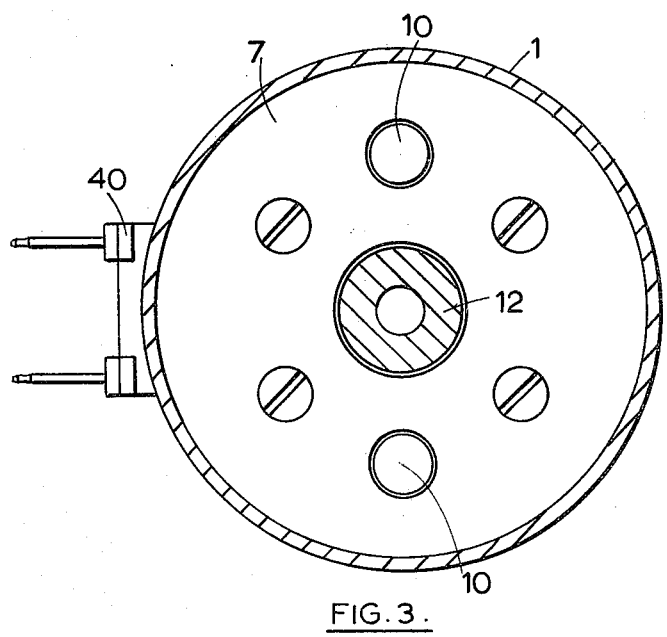
FIG. 3 is a section on the lines 3—3 of FIG. 2.
Figure 2:
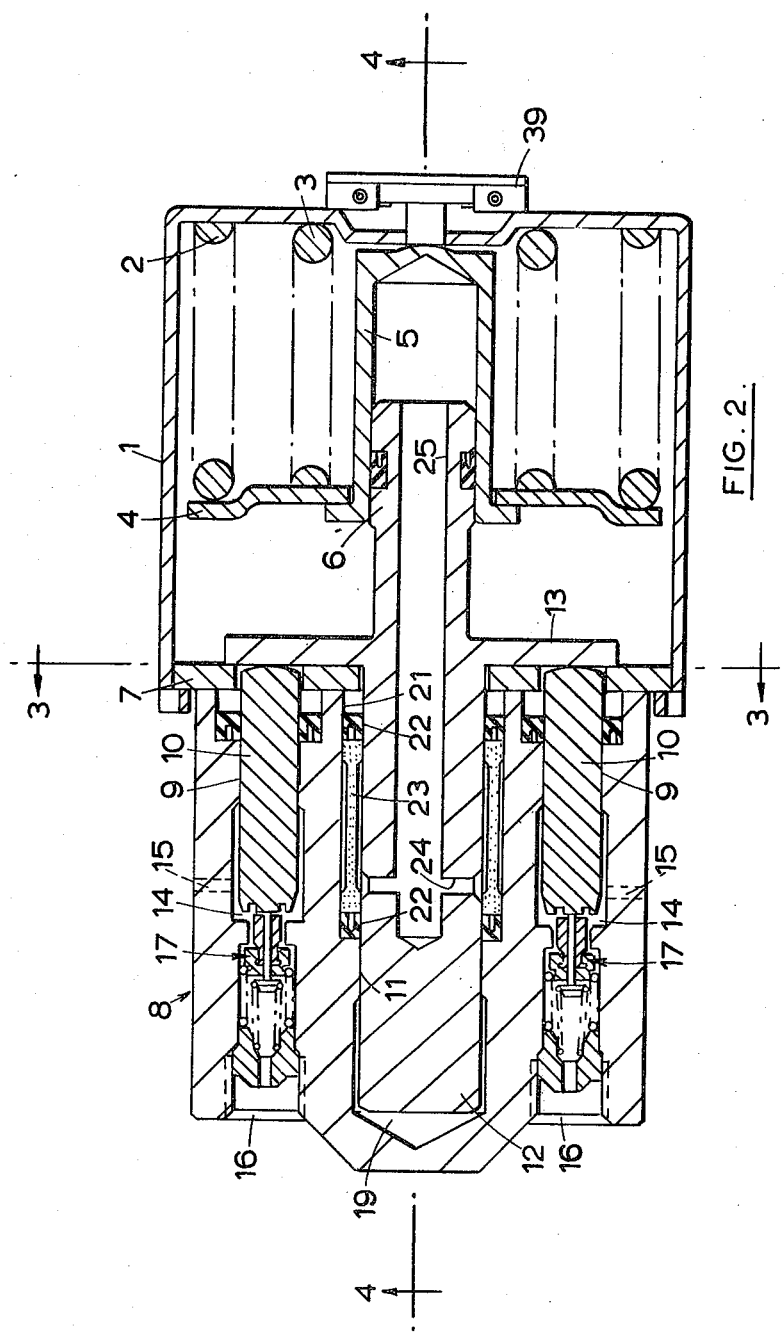
FIG. 2 is a longitudinal section of the assembly of FIG. 1.

Referring particularly to FIGS. 1–3 of the drawings, 1 is a pressed housing for two concentric springs 2 and 3 which act between the rear end of the housing 1 and a retaining plate 4 held on a hollow movable member 5. The interior of the member 5 is formed as a cylinder bore for a piston 6.

An end plate 7 covers the forward end of the housing 1 and to this plate is attached a cylinder block 8 in which are bored three cylinders arranged side-by-side with their axes co-planar and parallel. In the two outer cylinder bores 9 work first pistons 10 and in the central cylinder bore 11 works a second piston 12 which extends rearwardly through the end plate 7 to form the piston 6. On the rearward side of the end plate 7 the second piston 12 is provided with a radial flange 13 adapted to lie flat against the end plate and keep the first pistons 10 in forward or advanced positions, the cylinder bores 9 registering with holes in the end plate.

Each cylinder bore 9 opens into a chamber 14 which has an outlet 15 for connection to the brakes and an inlet 16 for connection to a master cylinder, the inlet being controlled by a two-stage valve 17 spring-loaded to the closed position. The valve 17 is a poppet type but it could be a ball type valve. Each valve 17 is held open by a piston 10 when it is in its advanced position so that there is free communication between the master cylinder and the brakes and the effective volume of chamber 14 is at a minimum value.

The central cylinder bore 11 is formed with two axially spaced, radial passages (FIG. 4), the forward passage 18 opening into an enlarged chamber 19 at the forward end of cylinder bore 11 and the rearward passage 20 opening into a counterbore 21 at the rearward end of cylinder bore 11. Axially spaced seals 22 are located in the counterbore 21 and are held in spaced relationship by a spacer 23 of plastics material. The counterbore 21 is connected to the interior of member 5 by radial passage 24 and a longitudinal bore 25 in piston 12.

In operation high pressure fluid is normally admitted into member 5 via passages 20, 24 and 25 to act on the exposed face of piston 6 (the first area) to hold piston 12 with the flange 13 against end plate 7, holding pistons 10 in their advanced positions. Since member 5 is movable relative to piston 6 it is held against the rear end of housing 1 compressing springs 2 and 3 and so acting as an accumulator. When a skid signal is received, the high pressure fluid is also admitted to chamber 19 via passage 18 and acts over the exposed face of piston 12 (the second area) to move the piston rearwardly. As shown the second area is larger than the first to assist the rearward movement. As flange 13 leaves end plate 7, pistons 10 move rearwardly under the influence of master cylinder pressure and the valve return springs, thus allowing valves 17 to close, the effective volume of chambers 14 to increase and the braking pressure to be relieved. It will be noted that a modulator is provided with two electrical switches, one 39 at the rear end of the housing 1 which detects if the member 5 is in contact with the housing, i.e., if the springs 2 and 3 are fully compressed, and the other 40 on the end plate 7 which detects whether the flange 13 is on contact with the housing, the construction and use of these switches is discussed in our pending U.S. Pat. application Ser. No. 291,237 now U.S. Pat. No. 3,843,209.

As shown in FIGS. 1 and 4 a solenoid valve housing 26 is secured to the cylinder block 8 with an inlet port 27 communicating with passage 20 and an outlet port 28 registering with passage 18. The housing 26 has a blind bore 29 in which are located inner and outer valve seat members 30, 31, defining axially spaced valve seats. A ball valve 32 is normally held in engagement with the inner seat by a spring-loaded push rod 33 which has a lost-motion connection with an armature 35 of a solenoid 36. The inner valve seat controls communication between the inlet port 27 and the outlet 28 and the outer valve seat controls communication between the outlet port and a reservoir port 37. The inlet is normally connected to a pump and the port 37 to a reservoir for the pump. It will be apparent that on energizing the solenoid 36, both the first and second areas of the piston 12 will be subjected to the same high pressure fluid.

FIG. 5 shows a similar solenoid valve but on a larger scale. Corresponding parts have been given the same numbers and it will be seen that the inner valve seat member 30 has a forwardly extending slotted portion 38 which serves to space the valve seats apart and act as a cage for ball 32. The outer end of the bore through the slotted portion 38 is enlarged to ensure that the ball 32 can engage the outer valve seat even if it is not concentric with the inner seat. The advantage of having the slotted portion 38 integral with the valve seat member 30 rather than as a separate spacer member is that it can be easily made concentric with the valve seat and so serve to guide ball 32 correctly to the inner valve seat. Also it enables the housing 26 to be machined with a single bore for both valve seat members.

In the second embodiment of the modulator assembly shown in FIGS. 6–8 there is a cylinder block 41 in which are bored three cylinder bores arranged side-by-side with their axes co-planar and parallel. In the two outer bores 42 work first pistons 43 and in the central bore 44 works a second piston 45 which itself has an axial blind bore 46. The second piston 45 extends rearwardly of the cylinder block 41 and terminates in an outwardly directed radial flange 47 on which is held an annular plate 48 adapted to lie flat against an annular seal retaining plate 49 which is fixed to the block 41 by screws or like means (not shown). The annular plate 48 is adapted to keep the first pistons 43 in forward or advanced positions, the bores 42 registering with holes in the seal retaining plate 49. The second piston 45 may be machined or pressed thereby making plate 48 integral with piston 45.

Each cylinder bore 42 opens into a chamber 50 which has an outlet 51 for connection to the brakes and an inlet 52 for connection to a master cylinder the inlet being controlled by a two-stage valve 53 spring-loaded to the closed position. The valve 53 is a poppet type but it could be a ball type valve. Each valve 53 is held open by a piston 43 when it is in its advanced position so that there is free communication between the master cylinder and the brakes and the effective volume of chamber 50 is at a minimum value.

In the blind bore 46 works a third piston 54, the rear end of which is engaged by a spring retaining plate 55. A spring 56 housed in a pressing 57 which is secured to the cylinder block 41, acts on the plate 55 to urge the third piston 54 forwardly. A passage 58 extends axially through the third piston 54.

A passage 59 in the cylinder block 41 leads radially from the central bore 44 to the outlet port 60 of a solenoid control valve 61 secured to the cylinder block. An inlet port 62 in the valve 61 is normally connected to a pump and communicates with the axial passage 58 through a flexible hose 63, an end fitting 64 on the hose being secured into a recess in the rear end of the third piston 54. A further port 65 in the valve is adapted to be connected to a fluid reservoir.

In operation high pressure fluid is normally admitted into the blind bore 46 via inlet port 62, hose 63 and passage 58 to act on the blind end of bore 46 (the first area) to urge piston 45 forwardly, the annular plate 48 holding the pistons 43 in their advanced positions. The fluid also acts on the piston 54 to urge it and the spring retaining plate 55 rearwardly, so compressing spring 56 until the plate 55 engages the rear end of the housing 57. Thus the space between the second and third pistons acts as an accumulator for pressure fluid.

When a skid signal is received by valve 61, the high pressure fluid is admitted to bore 44 via outlet port 60 and passage 59 and acts over the exposed face of piston 45 (the second area) to move the piston rearwardly. The second area is larger than the first area to assist the rearward movement. As plate 48 leaves plate 49, pistons 43 move rearwardly under the influence of master cylinder pressure and the valve return springs, thus allowing valves 53 to close, the effective volume of chambers 50 to increase, and the braking pressure to be relieved. The modulator is again provided with two electrical switches 39, 40 as in the first embodiment.

Figure 11:
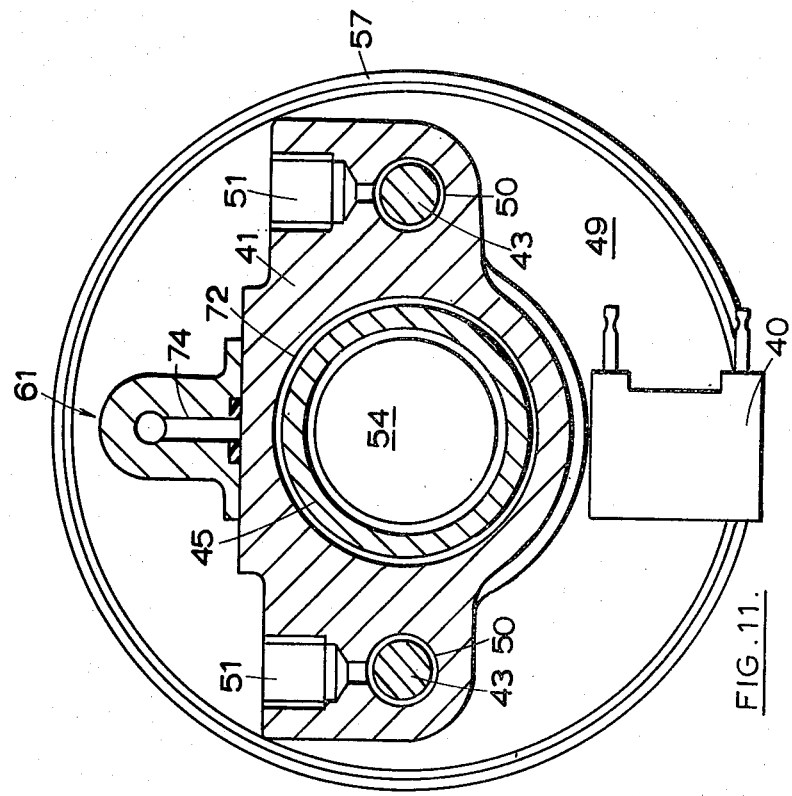
Figure 9:
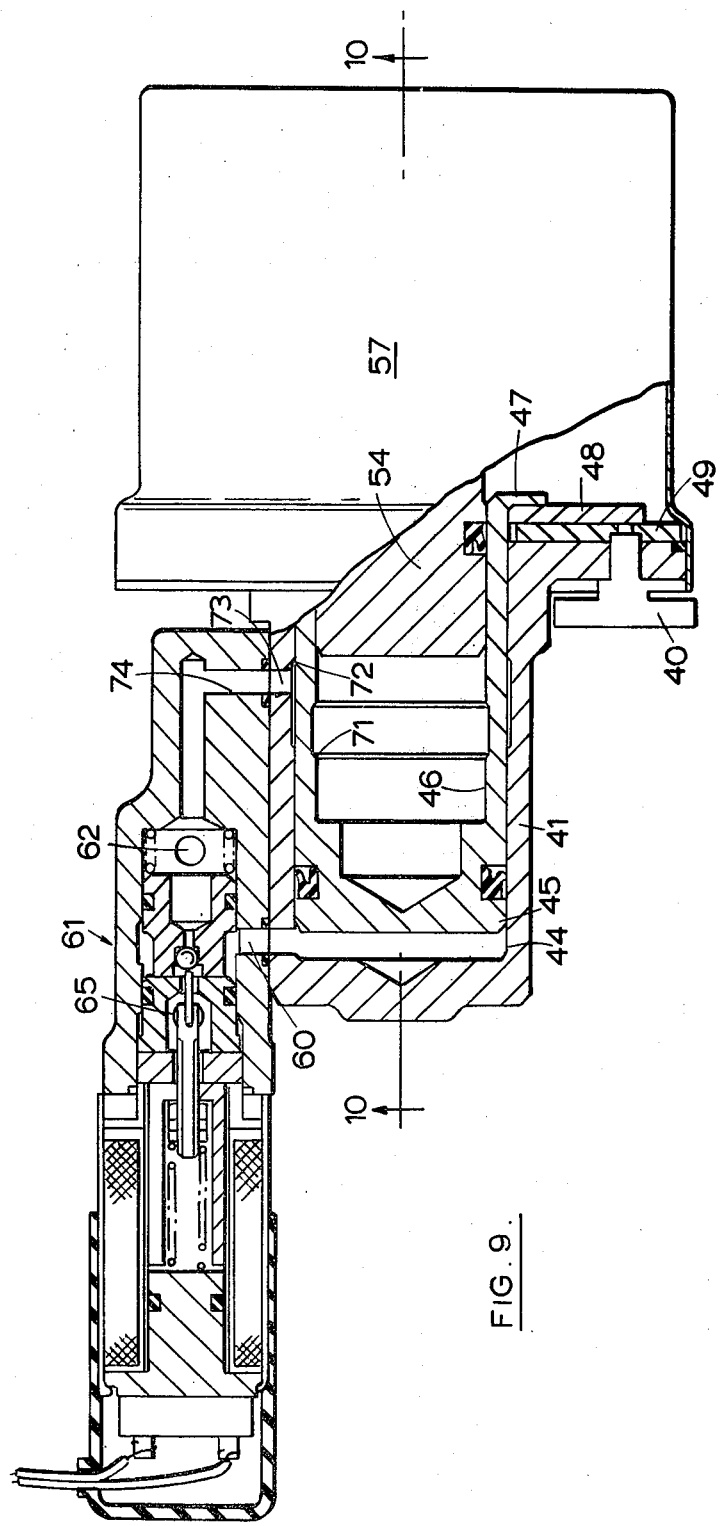

In the modulator assembly shown in FIGS. 9–11 equivalent parts to those in FIGS. 6–8 have been given the same reference numerals. It will be seen that the third piston 54 has no axial passage and fluid is admitted to the space between the second piston 45 and the third piston 54 via radial passages 70 which connect an annular groove 71 in the wall of bore 46 with an annular groove 72 in the wall of bore 44. The size and location of the passages 70 and the grooves 71, 72 are chosen so that there is communication between the two grooves for all normal positions of the pistons 45 and 54. A second radial passage 73 in cylinder block 41 leads into annular groove 72 and registers with a passage 74 in solenoid valve 61 communicating with inlet port 62. In this second embodiment an additional seal is required to seal bore 44 from bore 46. Operation of this embodiment is the same as the operation of the first embodiment.

In the modulator assembly shown in FIGS. 12 to 15 parts equivalent to those in FIGS. 9 to 11 have been given the same reference numerals. The main differences are that the outer end of piston 54 has been reshaped to be located in a smaller depression in the retaining plate 55 which is loaded by two coaxial springs instead of a single spring. Also the connection between the passage 74 in the solenoid valve and the passage 73 in the cylinder block is now an external pipe 80.

In the modulator assembly illustrated only one inlet valve 53 is used, a flow-through fitting 81 replacing the valve in the second bore 50, and the outlet 51 of the valve is connected to the inlet 52 of the fitting by an external pipe 82. A modulator connected as shown is suitable for use with a single brake circuit. Naturally the modulator assembly could be adapted for use with two separate brake circuits by using two valves 53.

The operation of this embodiment is the same as the previous embodiment.

I claim:

1. A modulator assembly for use in a hydraulic antiskid braking system of a vehicle incorporating at least one fluid circuit connected to a wheel brake, said modulator assembly comprising a body including a chamber adapted to be connected in said fluid circuit, a first piston working in a first cylinder bore in communication with said chamber and movable between an advanced position in which the volume of said chamber is at a minimum value and a retracted position, a second piston working in a second cylinder bore and acting on said first piston through an abutment, a first area of said second piston which is adapted to be subjected to hydraulic fluid under pressure to normally urge said first piston into the advanced position, and a second area of said second piston which is opposed to said first area and which is adapted to be subjected to hydraulic fluid under pressure in order to allow said first piston to move into the retracted position when the decleration of the braked wheel exceeds a predetermined value, said first and second pistons being arranged side-by-side in overlapping relationship with the said second area of said second piston being spaced from said abutment in a direction corresponding to that in which said first piston extends from said abutment, with said first piston and said second area of said second piston both being disposed on the same side of said abutment.

2. A modulator assembly as in claim 1 wherein there are a plurality of first pistons arranged with their axes parallel to and angularly spaced about the axis of said second piston.

3. A modulator assembly as in claim 2, wherein there are two of said first pistons arranged on opposite sides of said second piston so that the axes of the said two and said second pistons are parallel and co-planar.

4. A modulator assembly as claimed in claim 1 comprising a movable member sealingly engaged with said second piston and resiliently biassed towards said first area by a spring.

5. A modulator assembly as in claim 4, wherein said movable member is a third piston working in a blind bore in said second piston, the outer end of said third piston engaging a retaining member for said biassing spring.

6. A modulator assembly as in claim 5, wherein a radial passage through said second piston enables hydraulic fluid to enter the space between said second and third pistons.

7. A modulator assembly as in claim 1 wherein said body includes two chambers and a connection between said chambers.

8. A modulator assembly as in claim 1, incorporating a solenoid control valve for controlling the supply of hydraulic fluid under pressure to said second area of said second piston, said valve being adapted to be energised when the deceleration of the braked wheel exceeds the predetermined value.

9. A modulator assembly as in claim 8, comprising a cylinder block including said first and second cylinder bores, a passage in said cylinder block leading into said second cylinder bore, and a passage in said solenoid valve communicating with a valve outlet which registers with said passage in said cylinder block whereby hydraulic fluid can be supplied to act on said second area of said second piston.

10. A modulator assembly as in claim 9 wherein a passage in said solenoid valve communicating with a valve inlet registers with a second passage in said cylinder block leading into an annular recess in the wall of said second cylinder bore whereby hydraulic fluid can be supplied to act on said first area of said second piston.

11. A modulator assembly as in claim 9 wherein a passage in said solenoid valve communicating with a valve inlet is connected by an external connection to a second passage in said cylinder block, said second passage leading into an annular recess in the wall of said second cylinder bore whereby hydraulic fluid can be supplied to act on said first area of said second piston.

12. A modulator assembly as in claim 8 wherein said solenoid valve has a cylindrical bore in which are sealed two valve seat members, a valve seat in one member being axially spaced from a valve seat in the second member by an axially extending portion integral with one of the members.

* * * * *